United States Patent [19]

Fukui

[11] Patent Number: 4,631,600
[45] Date of Patent: Dec. 23, 1986

[54] TIME-AXIS CORRECTING CIRCUIT FOR RECORDED DATA REPRODUCING DEVICE

[75] Inventor: Tsutomu Fukui, Tokyo, Japan

[73] Assignee: Asahi Kogaku Kogyo Kabushiki Kaisha, Tokyo, Japan

[21] Appl. No.: 603,379

[22] Filed: Apr. 24, 1984

[30] Foreign Application Priority Data

Apr. 28, 1983 [JP] Japan .................................. 58-73903

[51] Int. Cl.⁴ ........................ H04N 9/493; H04N 5/781
[52] U.S. Cl. ..................................... 358/320; 358/322; 358/326; 358/337
[58] Field of Search ............... 358/320, 322, 337, 338, 358/339, 326; 360/73

[56] References Cited

U.S. PATENT DOCUMENTS

4,123,773  10/1978  Rotter et al. ................... 358/325 X
4,313,129  1/1982  Fukui .............................. 358/322 X Primary Examiner—Robert L. Richardson
Attorney, Agent, or Firm—Sughrue, Mion, Zinn, Macpeak and Seas

[57] ABSTRACT

A time-axis correcting circuit for a recorded data reproducing device such as a video disc player in which, even when a dominant time-axis error component is not a single-frequency component, suppression thereof is sufficiently achieved with a relatively simple circuit configuration. The time-axis correcting circuit includes first and second time-axis correcting circuits, each of which has a flywheel oscillator servo loop. The oscillation frequency of the first flywheel oscillator servo loop is set close to the lowest frequency of the dominant time-axis error component to be suppressed while that of the second time-axis correcting circuit is set close to the highest frequency of the dominant time-axis error component to be suppressed.

7 Claims, 13 Drawing Figures

TIME-AXIS CORRECTING CIRCUIT FOR RECORDED DATA REPRODUCING DEVICE

BACKGROUND OF THE INVENTION

The present invention relates to a time-axis correcting circuit for a recorded data reproducing device.

In a recorded data reproducing device, the reproduced signal can suffer from a time-axis error component attributed to nonuniform operation of the drive section. In a video signal reproducing device such as a video disc player or a video tape recorder, the reproduced picture is considerably adversely affected by such a time-axis error component included in the reproduced signal. Therefore, in order to improve the quality of the reproduced signal, the time-axis error component should be suppressed as much as possible.

Figure 1:
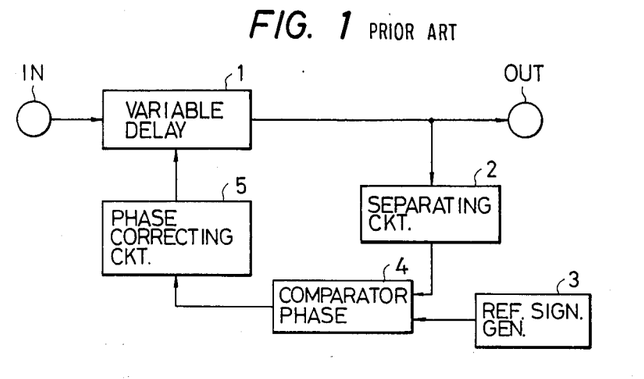
FIGS. 1 and 2 are block diagrams showing the arrangements of conventional time-axis correcting circuits.

In order to perform time-axis correction of the reproduced signal, a digital TBC device has been proposed which converts a reproduced signal into a PCM signal which is stored in a memory to thus absorb the time-axis error component. However, the use of a digital TBC device is not suitable for ordinary consumer use because the device is large in size and expensive. A time-axis correcting circuit proposed for consumer use is shown in FIG. 1 in block diagram form. In FIG. 1, reference numeral 1 designates a variable delay circuit capable of changing the delay time between the input signal and the reproduced output signal according to a control signal; 2, a separating circuit for separating timing data from the reproduced signal; 3, a reference signal generating circuit for producing a reference signal having a frequency equal to that of the timing data when no time-axis error component is present; 4, a phase comparator circuit for comparing the timing data separated by the separating circuit 2 with the reference signal to detect a time-axis error component of the timing data; and 5, a phase correcting circuit for determining the characteristics and stability of the closed-loop control system and which provides the control signal applied to the variable delay circuit 1.

In the phase comparison circuit 4, the reference signal and the timing data are compared in phase to extract the time-axis error component of the timing data as a time-axis error voltage. The latter signal is applied to the phase correcting circuit 5. The phase of the reproduced signal output applied to the variable delay circuit 1 is controlled according to the control signal provided by the phase correcting circuit 5. Accordingly, when the reproduced signal including the time-axis error component passes through the variable delay circuit 1, the time-axis error component is suppressed so that the reproduced signal is subjected to time-axis correction.

However, in the conventional time-axis correcting circuit, it is difficult to obtain precise coincidence of the frequency of the reference signal and the frequency of the timing data when no time-axis error component is present. Accordingly, the time-axis error voltage produced by the phase comparison circuit 4 includes a DC component corresponding to the frequency difference. The DC component of the time-axis error voltage may exceed the dynamic range of the closed-loop control system, and therefore the closed-loop control system may become unstable.

Figure 2:
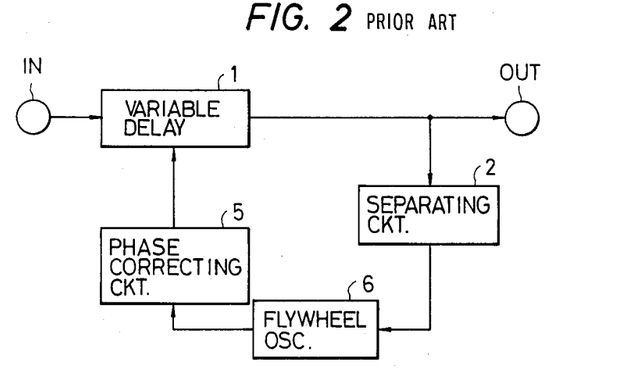

In order to overcome this difficulty, a time-axis correcting circuit as shown in FIG. 2 has been proposed. In FIG. 2, those components which have been described with reference to FIG. 1 are designated by the same reference numerals and characters. Only components which are different from those in FIG. 1 will be described.

In FIG. 2, reference numeral 6 designates a flywheel oscillator provided for detecting the time-axis error component of the timing data. The flywheel oscillator 6 is a PLL (phase-locked loop) circuit, including a voltage-controlled oscillator circuit. The closed-loop control characteristic of the PLL circuit is determined to lock the phase of the output signal to the low frequency time varying component of the phase of the timing data. The voltage-controlled oscillator circuit is coupled to a phase comparator inside the PLL circuit. The phase comparator detects the amount of phase shift of the timing data from the phase of the reference signal outputted by the voltage-controlled oscillator circuit and applies the resulting detection signal to the phase correcting circuit 5. The flywheel oscillator 6 itself is a stable, closed-loop control system, having a frequency characteristic including no intrinsic servo loop oscillation frequency.

In the time-axis correcting circuit utilizing the flywheel oscillator 6 constructed as described above, the frequency of the reference signal coincides with the frequency of the timing data when no time-axis error component is present, and the above-mentioned drawbacks accompanying the conventional time-axis correcting circuit of FIG. 1 are therefore eliminated. However, in a video disc player, the speed of the disc is set to typically 1800 r.p.m., and the main component of the frequency variation caused by the eccentricity of the disc is limited to 30 Hz. Thus, a recorded data reproducing device produces a separate, dominant time-axis error component. In the conventional time-axis correcting circuit of FIG. 2, the flywheel oscillator 6 can only detect a time-axis error component which is a high frequency time varying component of the phase of the timing data. Therefore, the conventional time-axis correcting circuit suffers from a difficulty in that it can suppress time-axis error components other than the dominant time-axis error component, but it cannot suppress the dominant time-axis error component.

Figure 3:
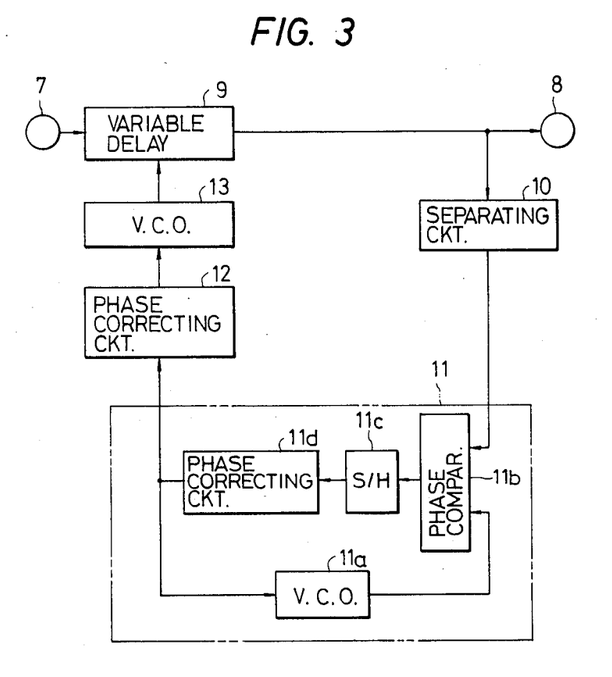
FIG. 3 is a block diagram showing a time-axis correcting circuit of a prior application.

In order to overcome this difficulty, the present applicant has proposed a time-axis correcting circuit which can suppress such a dominant time-axis error component without significantly increasing the circuit size. This circuit is described in Japanese Patent Application No. 215606/1982 and U.S. patent application Ser. No. 560,097, filed Dec. 12, 1983, which are described here to provide a better understanding of the present invention. This time-axis correcting circuit will be described with reference to FIG. 3. In FIG. 3, reference numeral 7 designates an input terminal for a reproduced signal; 8, an output terminal for a reproduced signal; 9, a variable delay circuit; and 10, a separating circuit employed as a timing data extracting circuit. A video signal is applied, as the reproduced signal, to the input terminal 7. The color burst signal of the video signal is utilized as the timing data. The variable delay circuit, which may be a charge-coupled element such as a CCD (charge-coupled device), operates to vary the delay time of the video signal. The separating circuit 10, implemented, for instance, with a 3.58 MHz B.P.F. burst gate circuit, separates the color burst signal from the video signal. Further in FIG. 3, reference numeral 11 designates a flywheel oscillator including a voltage-controlled oscillator circuit 11a, a phase comparator 11b, a sample-and-hold circuit 11c, and a phase correcting circuit 11d. The voltage-controlled oscillator circuit 11a produces a reference signal used for time-axis error detection. The phase comparison circuit 11b compares the phase of a color burst signal and the reference signal and produces a signal representing that difference. The sample-and-hold circuit 11c latches the time-axis error of the color burst signal, which is present discontinuously for a period of time corresponding to the horizontal synchronizing interval, to obtain a continuous time-axis error signal. The voltage-controlled oscillator circuit 11a, the phase comparison circuit 11b, the sampel-and-hold circuit 11c and the phase correcting circuit 11 form a sub servo loop.

Further in FIG. 3, reference numeral 12 designates a phase correcting circuit, and 13, a voltage-controlled oscillator circuit utilized as a drive circuit. The phase correcting circuit 12, the voltage-controlled oscillator circuit 13, the variable delay circuit 9, the separating circuit 10 and the flywheel oscillator 11 form a main servo loop. The phase correcting circuit 12 determines the control characteristics and stability of the main servo loop. The variable delay circuit 9 controls the delay time of the output video signal according to the clock output from the voltage-controlled oscillator 13, the frequency of which varies in response to the voltage of the output of the phase correcting circuit 12.

In sub servo loop of the flywheel oscillator 11 has a characteristic that the phase of the reference signal is locked to the low frequency time varying component of the phase of the color burst signal and the frequency of the reference signal is made the same as the frequency of the color burst signal when no time-axis error component is present. The sub servo loop itself has an oscillating characteristic (is stable). The oscillation frequency thereof is set to a value equal to the frequency of the dominant time-axis error component of the video signal. When the sub servo loop operates forming a part of the main servo loop, it is stable and does not oscillate.

In the above-described conventional time-axis correcting circuit, the dominant time-axis error component together with other time axis-error components is suppressed, and therefore the reproduced signal is improved in quality without increasing the size or complexity of the circuit significantly. However, since the time-axis error components other than the dominant time-axis error component are suppressed, for instance, by adjusting the characteristics of the phase correcting circuit 12, they cannot be totally suppressed. Especially in the case where the dominant time-axis error component is not of a single frequency, the suppression of the dominant time-axis error component is inadequate.

For instance, in a video disc player for reproducing a CAV disc rotating at a constant speed, the dominant time-axis error component is limited to a single frequency of 30 Hz. On the other hand, in a video disc player for reproducing a CLV disc rotating at a constant speed, the speed is 1800 r.p.m. at the innermost periphery and 600 r.p.m. at the outermost periphery, and hence the frequency of the dominant time-axis error component is distributed over a range of from 10 Hz to 30 Hz. Therefore, in the case where the dominant time-axis error component is distributed as described above, suppression cannot be accomplished sufficiently with the conventional time-axis correcting circuit in which suppression is carried out with a single frequency taken into account.

In view of the above-described difficulties accompanying a conventional time-axis correcting circuit, an object of the invention is to provide a time-axis correcting circuit for a recorded data reproducing device in which, even when the dominant time-axis error component is not of a single frequency, suppression can be sufficiently achieved without significantly increasing the circuit size or complexity.

SUMMARY OF THE INVENTION

In accordance with the above and other objects of the invention, there is provided a time-axis correcting circuit for a recorded data reproducing device including first and second time-axis correcting circuits connected in cascade. Each of the time-axis correcting circuits includes a flywheel oscillator loop, with the open-loop oscillating frequency of the first flywheel oscillator loop being at least close to a lowest frequency of a dominant time-axis error component to be suppressed, and that of the second being at least close to a highest frequency of the dominant time-axis error component to be suppressed.

DESCRIPTION OF THE PREFERRED EMBODIMENTS

The time-axis correcting circuit of the invention is constructed, as mentioned above, by cascade connecting the circuit elements of the above-described conventional time-axis correcting circuit. The principles of such a circuit will now be described.

Figure 4:
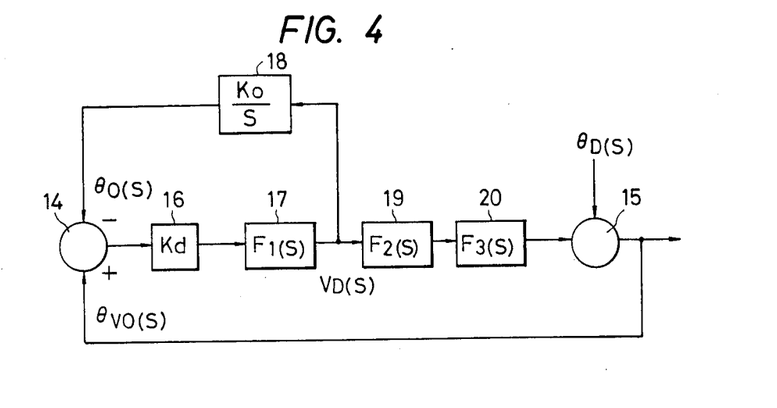
FIGS. 4, 5 and 6 are block diagram used for a description of the operating principles of a time-axis correcting circuit constructed according to the invention.

FIG. 4 is a block diagram used for a description of the principles of the invention in which the various circuits are regarded as transfer elements. In FIG. 4, reference numerals 14 and 15 designate summing points. The summing point 14 corresponds to the phase comparator 11b. The transfer function $K_d$ of the transfer element 16 corresponds to the conversion gain of the phase comparator 11b. The transfer element 17 corresponds to the phase correcting circuit 11d, having a transfer function $F_1(s)$. The transfer element 18 corresponding to the voltage-controlled oscillator circuit 11a is an integrating element having a conversion gain $K_0$, and hence a transfer function of $K_0/s$. $\theta_0(s)$ designates the phase of a reference signal outputted by the voltage-controlled oscillator circuit 11a. The transfer element 19, corresponding to the phase correcting circuit 12, has a transfer function $F_2(s)$. The transfer element 20 corresponds to the voltage-controlled oscillator circuit 13 and the variable delay circuit 9, having a transfer function F$_3$(s). Further, in FIG. 4, $\theta_D$(s) designates the phase of timing data included in a video signal applied to the variable delay circuit 9, and $\theta_{VO}$(s) designates the phase of timing data which has been outputted by the variable delay circuit 9 and which has been subjected to time-axis correction. The phase $\theta_0$(s) is a target value, the phase $\theta_{VO}$(s) is an amount of control, and the phase $\theta_D$(s) is an external disturbance.

Figure 5:
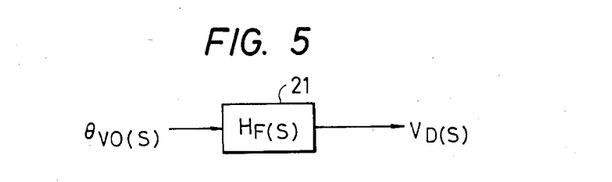

Analysis will be conducted with a sub servo loop includng the summing point 14 with the transfer elements 16, 17 and 18 taken into consideration. The transfer element 17 has an output V$_D$(s). In the case where the sub servo loop is converted into an equivalent circuit as shown in FIG. 5, according to the general expression of a closed loop control system, the transfer function H$_F$(s) of the transfer element 21 in FIG. 5 can be represented as follows:

$$H_F(s) = \frac{V_D(s)}{\theta_{VO}(s)} = \frac{K_d s F_1(s)}{s + K_0 K_d F_1(s)}. \tag{1}$$

It is assumed that the transfer element 17 is an integrating element. The transfer function F$_1$(s) of the transfer element 17 is:

$$F_1(s) = \frac{1}{\tau_1 s}, \tag{2}$$

where $\tau_1$ is a time constant. Such a transfer function can be readily realized by an integrator circuit connected in series with an operational amplifier.

Substituting F$_1$(s) of expression (2) into expression (1), $$H_F(s) = \frac{\omega n^2 s}{K_0(s^2 + \omega n^2)}, \tag{3}$$

$$\text{where } \omega n = \frac{K_0 K_d}{\tau_1}.$$

As is apparent from the above description, the characteristic equation has roots $s = \pm j\omega m$, and hence the sub servo loop, when not connected to the main loop, oscillates at an angular frequency $\omega n$.

Figure 6:
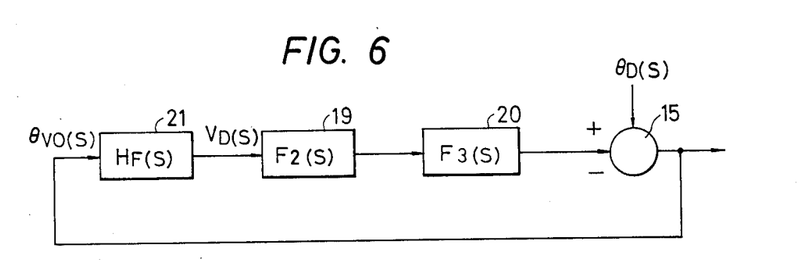

The sub servo loop can be represented by a transfer element 21. Therefore, the block diagram in FIG. 4 can be equivalently converted into that shown in FIG. 6. The phase $\theta_{VO}$(s) is as follows:

$$\theta_{VO}(s) = \frac{1}{1 + H_F(s)F_2(s)F_3(s)} \theta_D(s). \tag{4}$$

Expression (4) indicates the effect of the external disturbance $\theta_D$(s) on the output $\theta_{VO}$(s), $\theta_D$(s) indicating data included in $\theta_{VO}$(s). By substituting:

$$T_e(s) = \frac{1}{1 + H_F(s)F_2(s)F_3(s)} \theta_D(s) \tag{5}$$

$$F_2(s) = 1 \tag{6}$$

$$F_3(s) = K_c \tag{7}$$

$$H_F(s) = \frac{\omega n^2 s}{K_0(s^2 + \omega n^2)},$$

in expression (4), the following expression is obtained:

$$T_e(s) = \frac{\theta_{VO}(s)}{\theta_D(s)} = \frac{K_0(s^2 + \omega n^2)}{K_0 s^2 + K_c \omega n^2 s + K_0 \omega n^2}. \tag{8}$$

Figure 7:
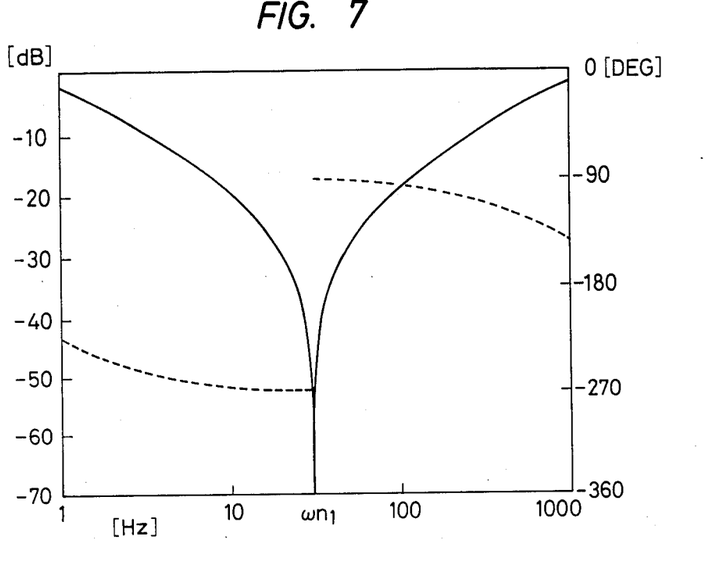
FIGS. 7 through 11 are Bode diagrams used for a description of the operating principles of the time-axis correcting circuit of the invention.

For K$_0$=7, K$_c$=1 and a frequency of 30 Hz (angular frequency $\omega n_1 = 2\pi \times 30$) in expression (8), a Bode diagram for the frequency range from 1 Hz to 1 KHz is obtained as shown in FIG. 7. In FIG. 7, a gain curve is indicated by the solid line, and a phase curve is indicated by the dotted line. The transfer function T$_e$(s) has a notch filter characteristic. That is, the transfer function T$_e$(s) decrease abruptly in a small range near the angular frequency $\omega n_1$, and the rate of decrease is reduced on both sides of the range. Therefore, the time-axis error component is sufficiently suppressed at frequencies near the angular frequency $\omega n_1$, but not at other frequencies. Accordingly, in the prior art approach, a complex frequency characteristic is required for the transfer function F$_2$(s) to improve the suppression characteristic at frequencies other than near the angular frequency $\omega n_1$. However, the maximum improvement is not more than about $-10$ dB to $-20$ dB, and it is difficult to provide desirable band suppression characteristics because the stability of the overall servo system must be taken into consideration. On the other hand, in accordance with the invention, a staggered cascade connection method is employed with the angular frequency varied, leading to markedly improved performance.

Figure 8:
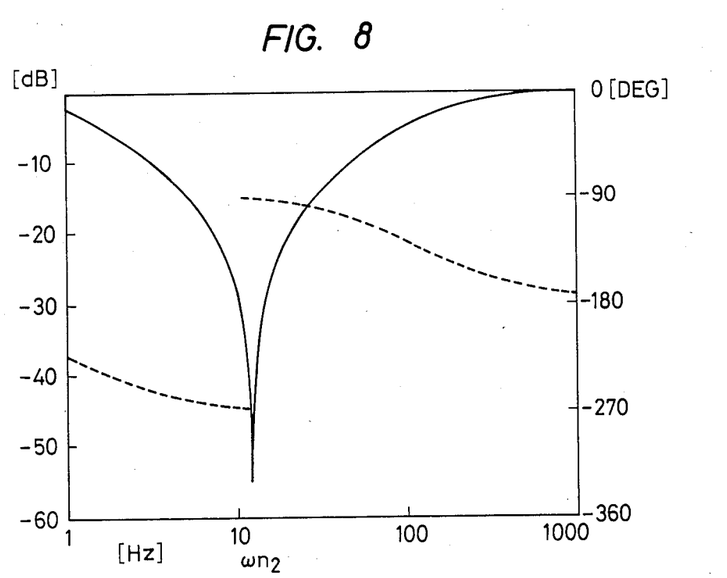
Figure 9:
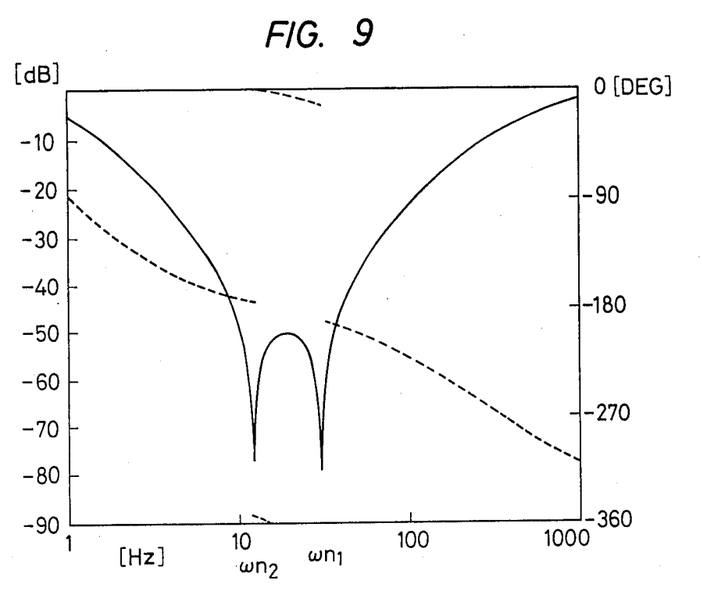
Figure 10:
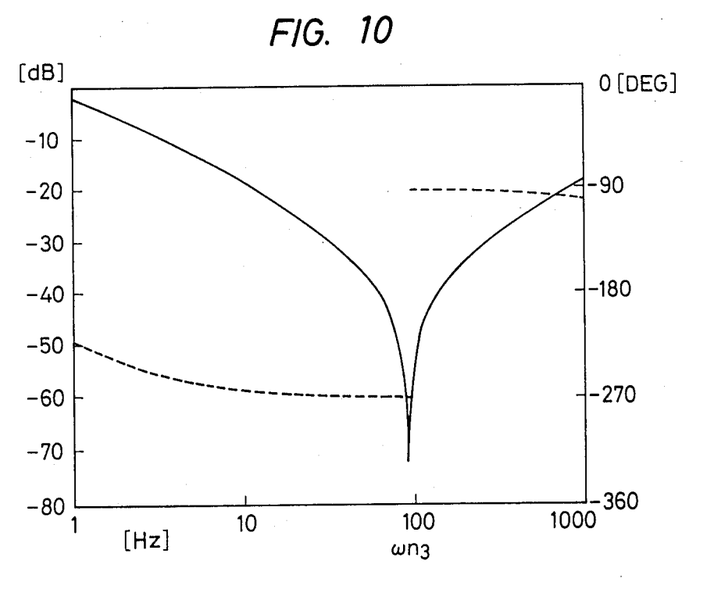
Figure 11:
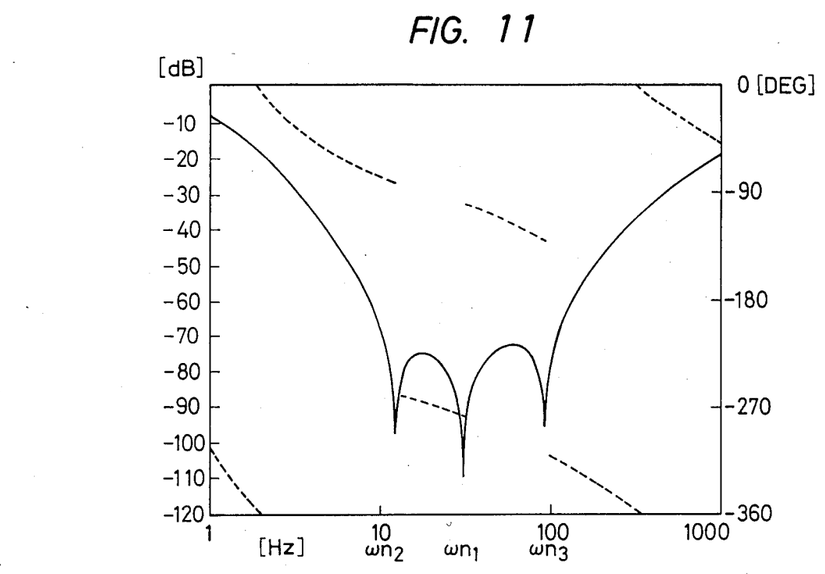

FIG. 8 is a Bode diagram in which the angular frequency $\omega n_2$ is $2\pi \times 12$ (Hz). FIG. 9 is also a Bode diagram obtained in the case when a time-axis correcting circuit having an angular frequency $\omega n_1 = 2\pi \times 30$ and a time-axis correcting circuit having an angular frequency $\omega n_2 \times 2\pi \times 12$ are cascade connected. In a frequency band of 10 Hz to 30 Hz, $\theta_D$(s) is suppressed below $-50$ dB. The overall characteristic is obtained by cascade connecting sub servo loops. Therefore, no interference is caused between the sub servo loops, and no factors adversely affecting the stability of the time-axis correcting system are produced, and hence the circuit can be readily implemented. For instance, when a time-axis correcting circuit having an angular frequency $\omega n_3 = 2\pi \times 90$ (Hz) is cascaded connected as the third stage (FIG. 10), the band suppression characteristic has a range from 10 Hz to 100 Hz as shown in FIG. 11.

Preferred embodiment of a time-axis correcting circuit according to the invention will be described with reference to FIGS. 12 and 13.

Figure 12:
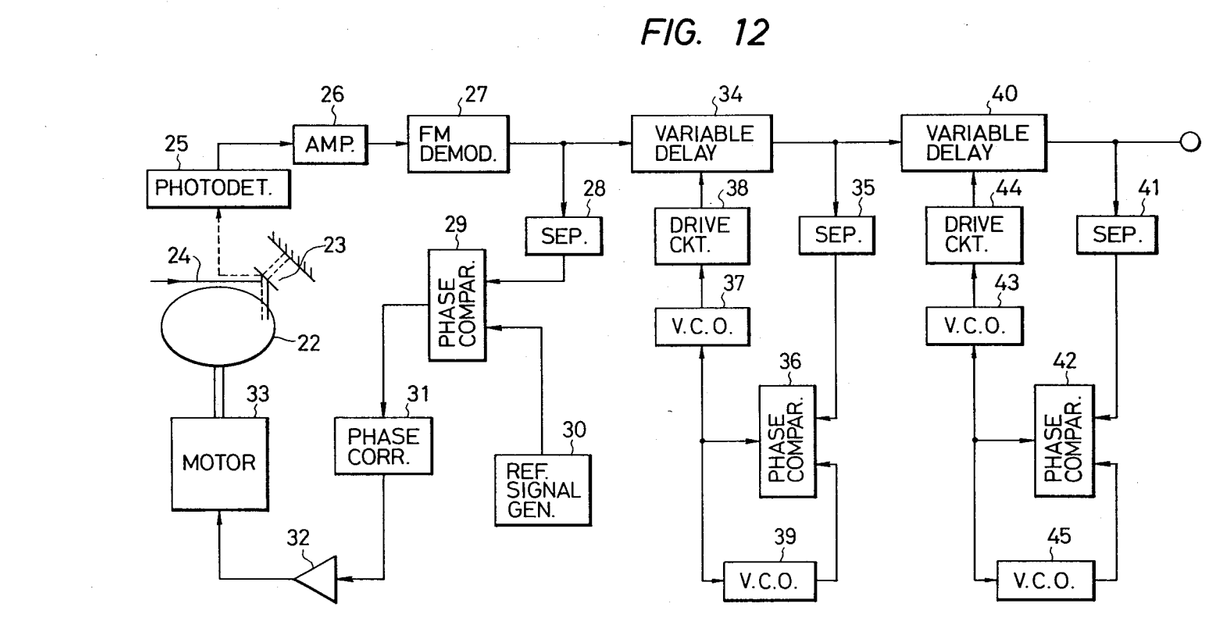
FIG. 12 is a block diagram showing a first embodiment of the invention in which the time-axis correcting circuit of the invention is applied to an optical video disc player.

In the first embodiment shown in FIG. 12, the time-axis correcting circuit of the invention is applied to an optical video disc player. In an ordinary optical video disc player, a tangential mirror moving in the tangential direction of the disc is used to perform time-axis correction. However, in the present example, time-axis correction is done purely electronically, that is, without the use of a tangential mirror.

In FIG. 12, reference numeral 22 designates an optical disc; 23, a stationary mirror; 24, a laser beam; and 25 a photodetector. The reflected laser beam 24 is converted into an electrical signal by the photodetector 25. Further in FIG. 12, reference numeral 26 designates a head amplifier; and 27, and FM demodulator. The electrical signal is amplified by the head amplifier 26 and is then demodulated into a baseband video signal by the FM demodulator 27. Reference numeral 28 designates a separating circuit; 29, a phase comparator; and 30, a reference signal generating circuit. The separating circuit 28 operates to separate the horizontal synchronizing signal as timing data. The phase comparator compares the phase of the reference signal with that of the horizontal synchronizing signal and produces a signal representative of the phase difference. A time-axis error voltage according to a time-axis error component is outputted as a servo error signal by the phase comparison circuit 29. The time-axis error voltage is applied to a phase correcting circuit 31. The output of the phase correcting circuit 31 is supplied to a motor drive circuit 32, which drives a spindle motor 33. In this example, the speed of rotation of the optical disc is controlled and the time-axis (phase) of a detection signal is corrected. The separating circuit 28, the phase comparison circuit 29, the reference signal generating circuit 30 and the phase correcting circuit 31 form the first stage of the time-axis correcting circuit, which arrangement is conventional. However, since the rotational inertia of the spindle motor 33 including the rotational inertia of the optical disc is large, in the servo loop only the static component of the reproduced signal (the DC component) is reproduced and corrected, and time-axis error components attributed to the eccentricity of the optical disc and external disturbances are not corrected.

The first stage is followed by the second stage time-axis correcting circuit. In FIG. 12, reference numeral 34 designates a variable delay circuit; 35, a separating circuit; 36, a phase comparator; 37, a voltage-controlled oscillator circuit; 38, a drive circuit; and 39, a voltage-controlled oscillator circuit. The variable delay circuit 34 may be a charge-coupled element such as a CCD. The separating circuit 35 extracts the horizontal synchronizing signal as timing data from the video signal. The voltage-controlled oscillator circuit 39 and the phase comparator 36 form a flywheel oscillator servo loop. The servo loop oscillation frequency is 12 Hz, which is near the lowest frequency of the time-axis error component as indicated by the Bode diagram of FIG. 8.

The second stage time-axis correcting circuit, which functions as a coarse adjustment circuit, is followed by the third stage time-axis correcting circuit, which functions as a fine adjustment circuit. In FIG. 12, reference numeral 40 designates a variable delay circuit; 41, a separating circuit; 42, a phase comparator; 43, a voltage-controlled oscillator circuit; 44, a drive circuit; and 45, a voltage-controlled oscillator circuit. The second stage time-axis correcting circuit and the third stage time-axis correcting circuit are cascade-connected. The separating circuit 41 operates to separate the color burst signal as timing data. The phase comparison circuit 42 and the voltage-controlled oscillator circuit 45 form a flywheel oscillator servo loop, the oscillation frequency of which is 30 Hz, which is close to the highest frequency of the time-axis error component.

In the first embodiment described above, the time-axis error suppression characteristic is as shown in FIG. 9. The dominating time-axis error component can be sufficiently suppressed for both a CAV-type disc and a CLV-type disc. In the first embodiment, the tangential mirror used in prior art players, which is liable to make the system operation unstable, is eliminated, reducing the cost of the device, improving the stability of the system, and simplifying the system. However, it should be noted that the technical concept of the invention is applicable to a conventional optical video disc player using such a tangential mirror.

Figure 13:
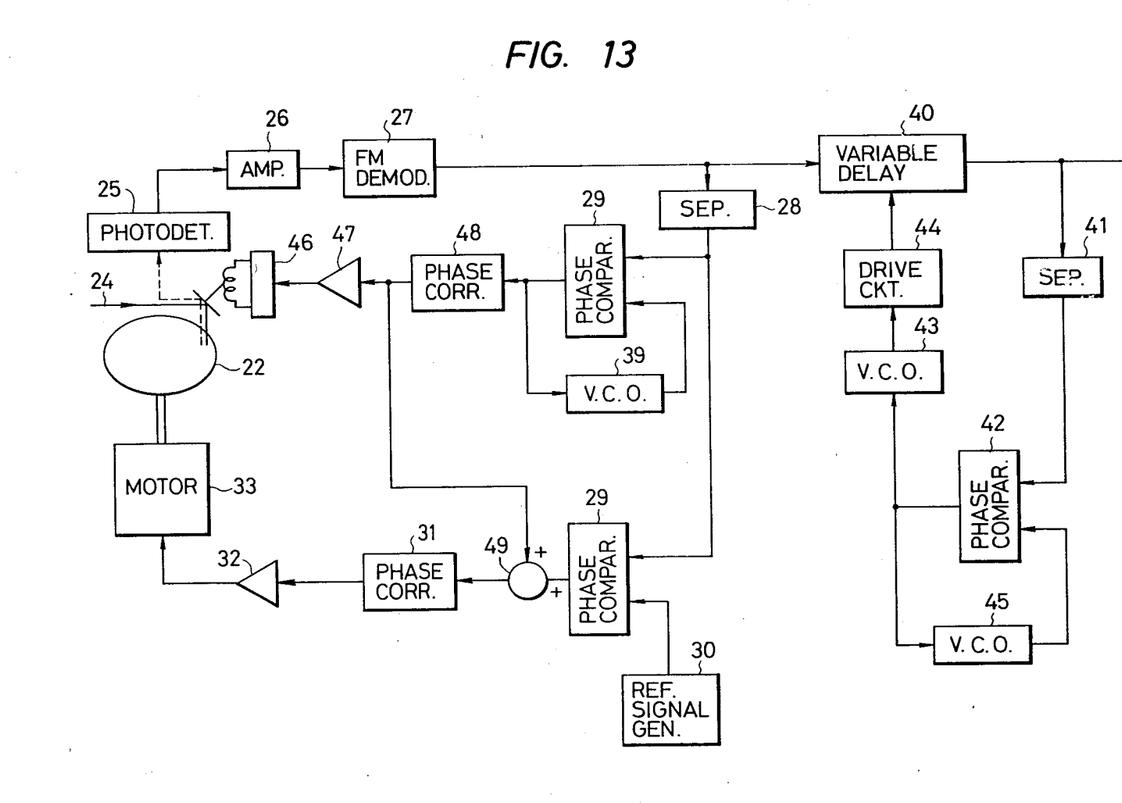
FIG. 13 is a block diagram showing a second embodiment of the invention in which the time-axis correcting circuit of the invention is applied to an optical video disc player.

In the second embodiment shown in FIG. 13, the time-axis correcting circuit of the invention is applied to an optical video disc player. In this example, a tangential mirror is utilized for time-axis correction. In FIG. 13, those components which have been described previously with reference to FIG. 12 are therefore designated by the same reference numerals. In FIG. 13, reference numeral 46 designates the tangential mirror; 47, a drive circuit; 48, a phase correcting circuit; and 49, a summing circuit. The phase correcting circuit 48 corrects the phase of the tangential servo system and outputs a tangential error signal. The spindle servo error signal from the phase comparison circuit 29 and the tangential error signal provided after phase correction are summed by the summing circuit 49. In this example, the servo function is performed by coupling double servo loops, the tangential servo loop system and the spindle servo loop system.

As is apparent from the above description, according to the invention, a plurality of time-axis correcting circuit forming elements, each including a flywheel oscillator servo loop, are cascade connected and the oscillation frequencies of the flywheel oscillator servo loops are made different from one another. Accordingly, it is not necessary to use a large-scale device such as a digital TBC using A/D and D/A converters. Furthermore, when the dominant time-axis error component includes a plurality of frequencies, the dominant time-axis error component is sufficiently suppressed.

What is claimed is:

1. A time-axis correcting circuit for a recorded data reproducing device, comprising:
    a first time-axis correcting circuit, comprising a first flywheel oscillator loop, for suppressing a time-axis error component having a frequency equal to a first predetermined oscillation frequency of said first flywheel oscillator servo loop; and
    a second time-axis correcting circuit, comprising a second flywheel oscillator loop, for suppressing a time-axis error component having a frequency equal to a second predetermined oscillation frequency of said second flywheel oscillator servo loop different from said first predetermined oscillation frequency, said first and second time-axis correcting circuits being cascade connected.

2. The time-axis correcting circuit as claimed in claim 1, wherein:
    said first predetermined oscillation frequency of said first flywheel oscillator servo loop is at least close to a lowest frequency of a dominant time-axis error component to be suppressed; and
    said second predetermined oscillation frequency of said second flywheel oscillator servo loop is at least close to a highest frequency of said dominant time-axis error component to be suppressed.

3. The time-axis correcting circuit as claimed in claim 1, wherein:
    said recorded data reproducing device comprises an optical video disc player;
    said first time-axis correcting circuit comprises a coarse adjustment circuit using a horizontal synchronizing signal of a demodulated video signal as timing data;
    said second time-axis correcting circuit comprises a fine adjustment circuit using a color burst signal of said demodulated video signal as timing data;

said first predetermined oscillation frequency of said coarse adjustment circuit is about 10 Hz; and said second predetermined oscillation frequency of said fine adjustment circuit is about 30 Hz.

4. The time-axis correcting circuit as claimed in claim 1, further comprising means for supplying a demodulated video signal of said recorded data reproducing device to an input of said first time-axis correcting circuit, and means for applying an output of said second time-axis correcting circuit to a spindle motor rotating a video disc to be reproduced by said recorded reproducing device.

5. The time-axis correcting circuit as claimed in claim 1, wherein said first time-axis correcting circuit and said second time-axis correcting circuit each comprise:

a variable delay circuit;

a separating circuit having an input coupled to an output of said variable delay circuit;

a phase comparator having a first input coupled to an output of said separator circuit;

a first voltage-controlled oscillator having an input coupled to an output of said phase comparator and an output coupled to a second input of said phase comparator;

a second voltage-controlled oscillator having an input coupled to said output of said phase comparator; and a drive circuit having an input coupled to an output of said second voltage-controlled oscillator and an output coupled to a delay control input of said variable delay circuit.

6. A time-axis correcting circuit for a recorded data reproducing device, comprising:

means for extracting a baseband video signal from an optical signal provided from a video disc to be reproduced;

a first separating circuit receiving said base band video signal for separating a horizontal synchronizing signal from said baseband video signal;

a reference signal generator;

a first phase comparator receiving as inputs an output of said first separating circuit and a reference signal produced by said reference signal generator;

a phase correcting circuit having an input coupled to an output of said first phase comparator, an output of said phase correcting circuit being applied to control a motor rotating said video disc;

a first variable delay circuit receiving as an input said baseband video signal;

a second separating circuit having an input coupled to an output of said first variable delay circuit for extracting a horizontal synchronizing signal from an output signal of said first variable delay circuit;

a second phase comparator having a first input coupled to an output of said second separating circuit;

a first voltage-controlled oscillator having an input coupled to an output of said second phase comparator and an output coupled to a second input of said second phase comparator;

a second voltage-controlled oscillator having an input coupled to said output of said second phase comparator;

a first drive circuit having an input coupled to an output of said second voltage-controlled oscillator and an output coupled to a delay control input of said first variable delay circuit;

a second variable delay circuit having an input coupled to said output of said first variable delay circuit;

a third separating circuit having an input coupled to an output of said second variable delay circuit for separating a color burst signal from an output signal of said second variable delay circuit;

a third phase comparator having a first input coupled to an output of said third separating circuit;

a third voltage-controlled oscillator having an input coupled to an output of said third phase comparator and an output coupled to a second input of said third phase comparator;

a fourth voltage-controlled oscillator having an input coupled to said output of said third phase comparator; and a second drive circuit having an input coupled to an output of said fourth voltage-controlled oscillator and an output coupled to a delay control input of said second variable delay circuit, said first voltage-controlled oscillator and said second phase comparator forming a sub servo loop having an open-loop oscillation frequency at least close to a lowest frequency of a dominant time-axis error component to be suppressed, and said third voltage-controlled oscillator and said third phase comparator forming a sub servo loop having an open-loop oscillation frequency at least close to a highest frequency of said dominant time-axis error component to be suppressed.

7. A time-axis correcting circuit comprising:

means for extracting a baseband video signal from an optical output signal from a video disc to be reproduced;

a first separating circuit for separating from said baseband video signal a horizontal synchronizing signal;

a first phase comparator having a first input coupled to an output of said first separating circuit;

a first voltage-controlled oscillator having an input coupled to an output of said first phase comparator and an output coupled to a second input of said first phase comparator;

a phase correcting circuit having an input coupled to said output of said first phase comparator and an output applied to control a tangential mirror for controlling a tangential position of an illuminating beam upon said video disc;

a second phase comparator having a first input coupled to said output of said first separating circuit;

a reference signal generating circuit having an output coupled to a second input of said second phase comparator;

a signal summing circuit for summing an output of said phase correcting circuit and an output of said second phase comparator;

a second phase correcting circuit having an input coupled to an output of said summing circuit and an output applied to control a motor rotating said disc;

a variable delay circuit having an input receiving said baseband video signal;

a second separating circuit for separating a color burst signal from an output signal of said variable delay circuit;

a third phase comparator having a first input coupled to an output of said second separating circuit;

a second voltage-controlled oscillator having an input coupled to an output of said third phase comparator and an output coupled to a second input of said third phase comparator;
a third voltage-controlled oscillator having an input coupled to said output of said third phase comparator; and
a drive circuit having an input coupled to an output of said voltage-controlled oscillator and an output applied to a delay time control terminal of said variable delay circuit, an open-loop oscillation frequency of a sub servo loop formed by said first voltage-controlled oscillator and said first phase comparator being at least close to a lowest frequency of a dominant time-axis error component to be suppressed, and an open-loop oscillation frequency of a sub servo loop formed by said second voltage-controlled oscillator and said third phase comparator being at least close to a highest frequency of said dominant time-axis error component to be suppressed.

* * * * *